Patented Nov. 4, 1947

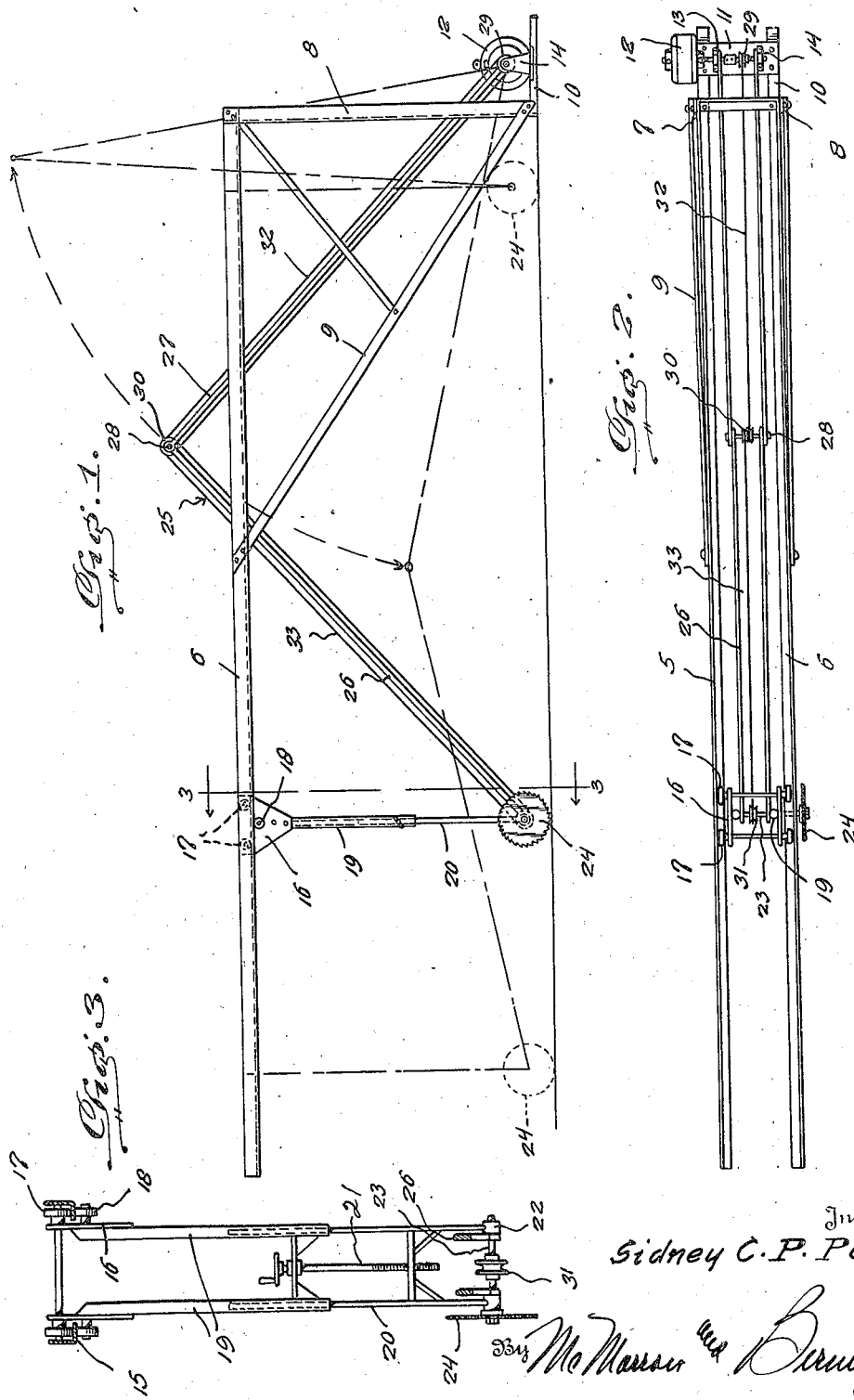

2,430,247

UNITED STATES PATENT OFFICE 2,430,247

OVERHEAD SUPPORTED TRAVELING SAW WOOD-SAWING MACHINE

Sidney C. P. Poole, Raleigh, Tenn.

Application April 24, 1944, Serial No. 532,481

1 Claim. (Cl. 143—47)

The present invention relates to new and useful improvements in woodworking machines, and more particularly to a simplified structure embodying a driven saw and means for manipulating the saw over the surface of the work, either for cutting lumber or for dadoing, scarfing, rabbeting at a desired depth and for other surface cutting of the work.

An important object of the present invention is to provide a frame from which the saw is suspended and including a track having a carriage adapted to travel thereon and to which the saw is attached, together with means for the vertical adjustment of the saw to regulate the depth of the cut.

It is also an important object of the present invention to provide continuous drive means for the saw while the latter is moved over the work.

A further object is to provide an apparatus of this character of simple and practical construction, which is efficient and reliable in performance, relatively inexpensive to manufacture and operate, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a side elevational view.

Figure 2 is a top plan view.

Figure 3 is a vertical sectional view taken substantially on a line 3—3 of Figure 1.

Referring now to the drawing in detail, wherein for the purpose of illustration I have disclosed a preferred embodiment of the invention, the numerals 5 and 6 designate a pair of spaced parallel tracks supported in an elevated position by posts 7 and 8 and to the upper ends of which one end of the tracks are attached. Braces 9 are provided for each of the tracks and extend from the lower portions of the posts to an intermediate portion of the track to maintain the same in a rigid position.

A base 10 extends from the bottoms of the posts 7 and 8 in a direction opposite from the track, the base including a platform 11 on which an electric motor 12 is supported, the motor driving a sectional shaft 13 journaled in bearing 14 secured on the platform 11.

The tracks 5 and 6 are preferably constructed of angle iron and each includes an inwardly extended horizontal flange 15 on which a carriage 16 is adapted to travel by means of upper and lower rollers 17 and 18 engaging the upper and lower surfaces, respectively, of the flanges 15 of the tracks.

The carriage 16 includes a pair of tubular legs 19 having extensions 20 slidably carried in the lower portions of the legs and adjustable relative thereto by a hand-operated feed stem 21.

Bearings 22 are formed on the lower ends of the extensions 20 and in which a shaft 23 is journaled, the shaft having a circular saw 24 secured at one end thereof.

A frame designated generally at 25 is composed of a pair of front spaced parallel arms 26 pivotally connected at their front ends to the shaft 23 and a pair of rear spaced parallel arms 27 pivotally connected to the respective front arms 26 at their rear ends by a pin 28. The rear ends of the rear arms 27 are pivotally supported on the shaft 13.

A drive pulley 29 is secured to the shaft 13 while a double pulley 30 is freely mounted on the pin 28 and a pulley 31 is secured to the shaft 23.

A belt or other flexible drive member 32 operatively connects the pulley 29 with the pulley 30 while a similar flexible drive member 33 operatively connects the pulley 30 with the pulley 31.

The shaft 13 is driven by the motor 12 and power is thus transmitted to the saw 24 through the drive members 32 and 33.

The saw 24 is adapted to travel along the surface of the work by means of the carriage 16 mounted on the tracks 5 and 6 and the frame 25 may be raised or lowered, as indicated by the dot-and-dash lines in Figure 1 of the drawing in accordance with the movement of the saw 24 from one edge of the work toward the other edge thereof.

The depth of the cut made by the saw 24 may be regulated by the vertical adjustment of the extensions 20 in the legs 19.

It is believed that the details of construction, operation and advantages of the device will be readily understood from the foregoing without further detailed explanation.

Having thus described the invention, what I claim is:

In a woodworking machine, a base, a pair of spaced vertical posts rising from one end of the base, a pair of spaced overhead horizontal tracks each extending from the upper end of one of the posts and in braced relation thereto, a carriage suspended from the tracks and guided thereby against movement away from the tracks, a pair of parallel spaced tubular members depending from the carriage, a horizontal member connecting the tubular members, an elongated vertical member journaled adjacent its upper end in the horizontal connecting member and having its lower end threaded, a pair of spaced parallel members each slidable in one of the tubular members, a second horizontal member connecting the spaced slidable members and forming a nut for the threaded vertical member for adjustment of the slidable members in the tubular members, a driven shaft journaled horizontally through the lower ends of the slidable members, a pulley carried on the driven shaft between the slidable members, a saw on one end of the driven shaft and outwardly of one of the slidable members, a frame pivoted with one end on the driven shaft between the slidable members, a second frame pivoted to the other end of the first frame, a pair of pulleys on the pivotal connection between the two frames, a flexible connection between the pulley on the driven shaft and one of the pulleys on the pivotal connection between the frames, a motor on the base and having a shaft journaled on the base and forming a pivotal support for the other end of the second frame and carrying a pulley, a second flexible member connected to the other pulley on the pivotal connection between the two frames and to the pulley on the motor shaft.

SIDNEY C. P. POOLE.

REFERENCES CITED

The following references are of record in the file of this patent:

UNITED STATES PATENTS

| Number | Name | Date |
|---|---|---|
| 422,332 | Bronson | Feb. 25, 1890 |
| 987,747 | Scheck | Mar. 28, 1911 |
| 1,189,603 | Michener | July 4, 1916 |
| 1,699,582 | Breidenbach | Jan. 22, 1929 |
| 1,373,864 | Carlson | Apr. 5, 1921 |
| 13,305 | Fulghum | July 24, 1855 |
| 1,725,295 | Orr | Aug. 20, 1929 |
| 1,908,713 | McCarroll | May 16, 1933 |